(12) United States Patent
Dai et al.

(10) Patent No.: US 9,174,152 B2
(45) Date of Patent: Nov. 3, 2015

(54) FILTER MEDIUM AND METHOD OF FABRICATING THE SAME

(71) Applicant: Taiwan Textile Research Institute, New Taipei (TW)

(72) Inventors: Chung-Feng Dai, New Taipei (TW); Huan-Sheng Chien, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 25 days.

(21) Appl. No.: 14/038,756

(22) Filed: Sep. 27, 2013

(65) Prior Publication Data

US 2015/0000233 A1    Jan. 1, 2015

(30) Foreign Application Priority Data

Jun. 28, 2013    (TW) .............................. 102123289 A

(51) Int. Cl.
*B01D 46/00*    (2006.01)
*B01D 39/16*    (2006.01)

(52) U.S. Cl.
CPC ......... *B01D 39/1623* (2013.01); *Y10T 442/615* (2015.04)

(58) Field of Classification Search
CPC . B01D 2275/10; B01D 39/1623; B01D 46/10
USPC .............. 55/486–487, 385.1; 210/491, 493.1, 210/505, 508; 442/341; 96/153
See application file for complete search history.

(56) References Cited

U.S. PATENT DOCUMENTS

| 8,172,092 B2* | 5/2012 | Green et al. .................. 210/491 |
| 2012/0149273 A1* | 6/2012 | Moore et al. .................. 442/400 |

* cited by examiner

*Primary Examiner* — Robert Clemente
*Assistant Examiner* — Karla Hawkins
(74) *Attorney, Agent, or Firm* — Jianq Chyun IP Office

(57) ABSTRACT

Provided is a method of fabricating a filter medium including the following steps. An assembly of first fiber is formed by a first spinning device. A plurality of second fiber is formed by a second spinning device. On a reception device is collected a film having a three-dimensional non-woven structure constructed by the first fibers and the second fibers. Each of the first fibers has a diameter of 1-50 μm. Each of the second fibers has a diameter of 1-1000 nm. The second spinning device is positioned between the first spinning device and the reception device. The first fibers and the second fibers stack with each other in a random manner to form the three-dimensional non-woven structure.

10 Claims, 3 Drawing Sheets

FILTER MEDIUM AND METHOD OF FABRICATING THE SAME

CROSS-REFERENCE TO RELATED APPLICATION

This application claims the priority benefit of Taiwan application serial no. 102123289, filed on Jun. 28, 2013. The entirety of the above-mentioned patent application is hereby incorporated by reference herein and made a part of this specification.

BACKGROUND

1. Technical Field

The present invention relates to a filter medium and the method of fabricating the same, and more particularly, to a composite filter medium and the method of fabricating the same.

2. Description of Related Art

Various designs of air cleaner have been proposed to improve the quality of life of human beings. Every technical development contributes to the significant improvement of the indoor air quality (IAQ). Generally, the air cleaners can be divided into several categories by the cleaning technology: the high efficiency particulate air filter (HEPA filter), the ultra low penetration air filter (ULPA filter), the activated carbon air filter, or the anion air filter, etc.

HEPA or ULPA filters are examples of the most popular filters used in the area of air cleaner. Commercially, the most commonly seen HEPA or ULPA filter include a paper product formed by combining glass fibers with resin. The paper product is fabricated by a wet process, in which the fibers (e.g., borosilicate glass fibers or cellulose fibers) are dissolved into a slurry containing water-soluble adhesives so that the fibers can be randomly directed, resulting in a better filtration efficiency. However, for an HEPA filter or a ULPA filter to achieve a satisfactory filtration effect, the weight per unit area thereof should be greater than 70 g/m$^2$ (tested with 0.3 µm particulates under a flow rate of 10.5 L/min, the filtration efficiency being greater than 99.97%, the pressure loss being 32 mmH$_2$O), which usually results in high pressure loss. Further, with regard to the glass fibers, there are problems arising from the high density, high air resistance, poor alkali resistance, brittleness, high melting point, and dermal irritation. Also, it is difficult to treat the waste by combustion, and thus the recycling becomes an issue.

SUMMARY

The present invention provides a filter medium for air filtration with a high filtration efficiency and a low pressure loss.

The present invention provides a method of fabricating a filter medium including the following steps. An assembly of first fiber is formed by a first spinning device. A plurality of second fiber is formed by a second spinning device. On a reception device is collected a film having a three-dimensional non-woven structure constructed by the first fibers and the second fibers. Each of the first fibers has a diameter of 1-50 µm. Each of the second fibers has a diameter of 1-1000 nm. The second spinning device is positioned between the first spinning device and the reception device. The first fibers and the second fibers stack with each other in a random manner to form the three-dimensional non-woven structure.

In an embodiment, each of the first fibers is a continuous long fiber or a short fiber having a length greater than 3 mm.

In an embodiment, each of the second fibers is a continuous long fiber.

In an embodiment, the first spinning device is a melt-blowing apparatus and the second spinning device is an electro-spinning apparatus.

In an embodiment, the first fibers are drawn by a hot air having a pressure of 10-20 psi during the formation of the first fibers by the melt-blowing apparatus.

In an embodiment, the electro-spinning apparatus has a linear electrode connected to a high-voltage power supply, and is capable of producing continuous nano-fibers which then incorporates into a structure formed by the first fibers.

The present invention provides a filter medium including a supporting layer constructed by a plurality of first fibers, wherein each of the first fibers has a diameter of 1-50 µm, and each of the first fibers is a continuous long fiber or a short fiber having a length greater than 3 mm, and a plurality of second fibers dispersed in the supporting layer, wherein each of the second fibers has a diameter of 1-1000 nm, and the second fibers and the first fibers stack with each other in a random manner to form a three-dimensional composite structure combining a nano-structure and a micro-structure.

In an embodiment, the first fibers are formed by a melt-blowing process, and the second fibers are formed by an electro-spinning process.

In an embodiment, each of the first fibers has a diameter of 1.0-50.0 µm, and each of the second fibers has a diameter greater than or equal to 1.0 nm and less than 1000.0 nm.

In an embodiment, a content of the second fibers is 0.1-50.0% based on a total weight of the first fibers and the second fibers.

In an embodiment, the supporting layer has a weight per unit area of 0.5-300.0 g/m$^2$.

The present invention provides an air conditioning equipment including the aforementioned filter medium.

Accordingly, the present invention provides a filter medium and a method of fabricating the same. The filter medium contains two kinds of fibers with different diameter ranges. The thinner fibers are dispersed in the supporting layer composed of the coarse fibers. The filter medium has a superior filtration efficiency, and the pressure loss thereof is satisfactory.

In order to make the aforementioned and other objects, features and advantages of the present invention comprehensible, several non-limiting embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the present invention and, together with the description, serve to explain the principles of the invention.

DESCRIPTION OF EMBODIMENTS

Figure 1:
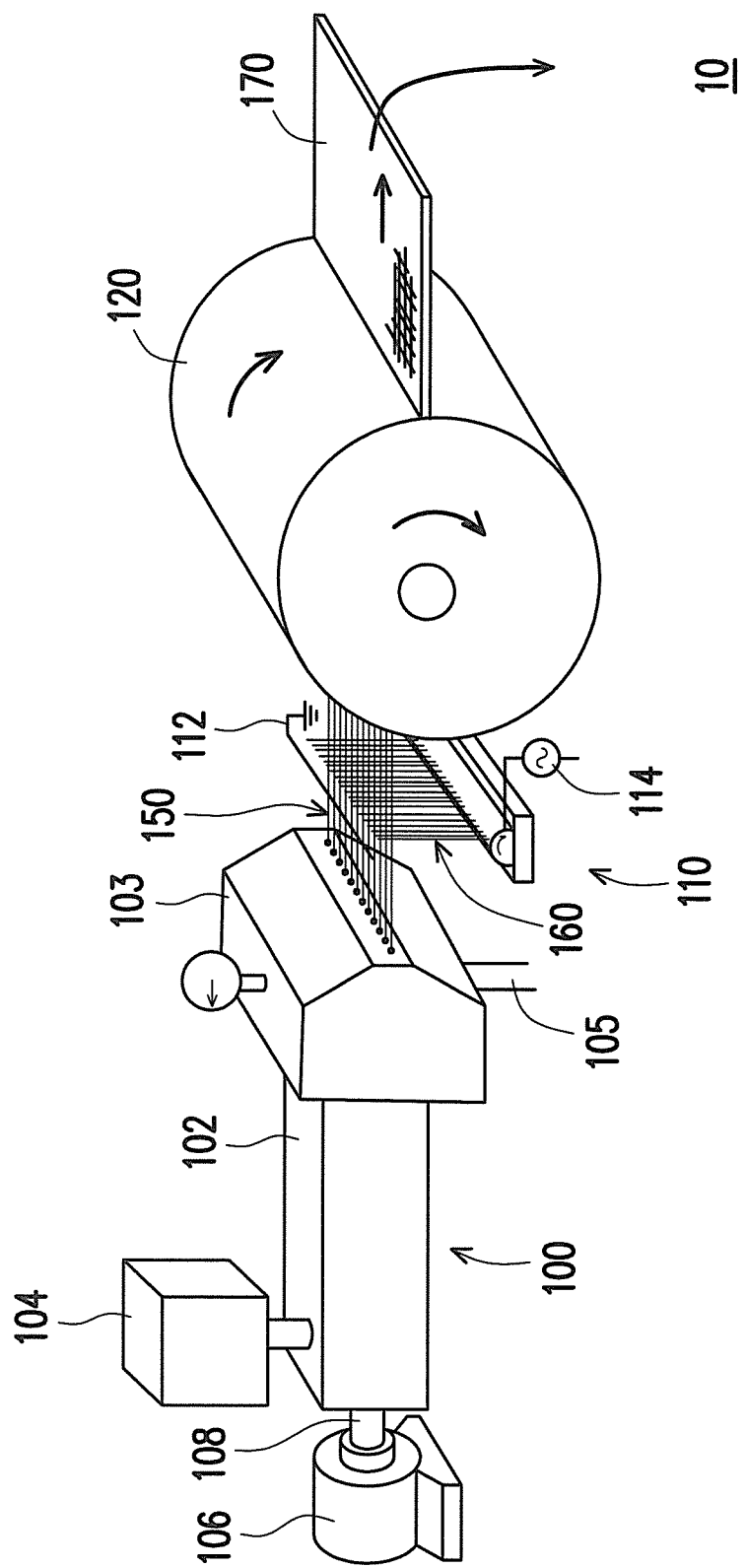
FIG. 1 is a schematic diagram illustrating an apparatus for fabricating a filter medium according to the first embodiment of the present invention.

Reference will now be made in detail to the embodiments of the invention, examples of which are illustrated in the accompanying drawings. Wherever possible, the same reference numbers are used in the drawings and the description to refer to the same or like elements.

Recitation of ranges of values herein are merely intended to serve as a shorthand method of referring individually to each separate value falling within the range, unless otherwise indicated herein, and each separate value is incorporated into the specification as if it were individually recited herein. For example, the recitation "the diameter ranges from 10 μm to 100 μm" implies the recitation "the diameter ranges from 50 μm to 80 μm," whether "50 μm" and "80 μm" are recited in the specification or not.

The first embodiment of the present invention provides a method of fabricating a filter medium. The first embodiment will be described in detail with reference to FIG. 1.

FIG. 1 is a schematic diagram illustrating an apparatus for fabricating a filter medium according to the first embodiment of the present invention.

Referring to FIG. 1, an apparatus 10 for fabricating a filter medium includes a first spinning device and a second spinning device. Here, the first spinning device is illustrated as a melt-blowing apparatus 100, and the second spinning device is illustrated as an electro-spinning apparatus 110. The present invention, however, is not limited thereto. The first spinning device and the second spinning device can be any other spinning devices as long as they can produce the first fibers, the second fibers, and the non-woven structure as described later. For example, in other embodiments, the first spinning device may be a spun-bond apparatus or a melt-spinning apparatus, and the second spinning device may be a melt-blowing apparatus or a solution blown apparatus.

As the melt-blowing apparatus 100, the first spinning device includes a heater 102, a feed inlet 104, a driving device 106, a screw rod 108, a melt-blowing mold 103, and a gas inlet 105. In this embodiment, the raw material for the first fibers may be any material suitable for the melt-blowing process such as polypropylene, polyester, polyurethane, polyamide, or polyphenylene sulfide. The raw material is fed into the heater 102 via the feed inlet 104 and melt in the heater 102 by heating. The driving device 106 drives the screw rod 108 so that the melt is uniformly mixed in the heater 102. Further, hot air can be driven into the gas inlet 105 to blow the melting raw material out from the spinneret of the melt-blowing mold 103 to form a plurality of first fibers 150.

The spinneret of melt-blowing mold 103 may have a pore size between 0.2 mm and 0.5 mm. The pore size of the spinneret may have some influence on the uniformity of the diameter of the first fibers 150. For example, as the other process parameters are kept unchanged, fibers fabricated by using a spinneret with a pore size of 0.22 mm may have a better uniformity than fibers fabricated by using a spinneret with a pore size of 0.5 mm. The discharge amount of the spinneret may lie between 0.01 g/hole/min and 0.5 g/hole/min. Thereby, the diameter of each of the first fibers 150 fabricated by the melt-blowing apparatus 100 lies between 1 μm and 50 μm.

The diameter of each of the first fibers 150 depends not only on the pore size and discharge amount of the spinneret of the melt-blowing mold 103, but also on the pressure of the hot air during the melt-blowing process. In view of a better filtration efficiency, the hot air drawing the first fibers 150 may have a pressure of 10 psi to 20 psi.

The melt-blowing process is a continuous process which can produce fibers with no particular upper limit on fiber's length. In practice, the length of a fiber then may be adjusted by any know method (e.g., cutting), according to the desired properties of the fiber product. For example, the length of each of the first fibers 150 may be greater than 3 mm, greater than 8 mm, greater than 20 mm, or greater than 50 mm. On the other hand, in the field of the spinning technology, the so-called "short" fiber generally has a length between 3 mm and 8 mm. If a filter is made by short fibers, the mechanical blocking effect may be inferior because there are too many disjoints between fibers. From this perspective, if each of the first fibers 150 is formed by a melt-blowing process, it may have a length much greater than that of the so-called "short" fiber, and therefore, a product made by the first fibers 150 may have a better mechanical strength. Of course, the above-mentioned is only one aspect of the first fibers 150. There is no particular limit on the fabricating method or the length of the first fibers 150.

In addition, the weight per unit area of the fiber web constructed solely by the first fibers 150 may lie between 0.5 g/m$^2$ and 300 g/m$^2$, e.g., between 15 g/m$^2$ and 35 g/m$^2$.

Referring back to FIG. 1, the second fibers 160 are formed by the electro-spinning apparatus 110, and the diameter of each of them lies between 1 nm and 1000 nm. The electro-spinning apparatus 110 is electrically connected to a high voltage power supply 114. The electro-spinning apparatus 110 may be a conventional electro-spinning apparatus, or may include a linear electrode 112. With the aid of the linear electrode 112, the diameters of the second fibers 160 may be distributed more uniformly. In this embodiment, the material of the second fibers 160 may be any material suitable for the electro-spinning process such as water-soluble polyvinyl alcohol (PVA) or oil-soluble polyamides. In addition, a thermal cross-linking agent may be added into the spinning dope to improve the hydrolysis resistance of the fiber product. For example, in an embodiment where the spinning dope is a polyvinyl alcohol solution, isocyanate can be added thereinto as the thermal cross-linking agent.

As shown in FIG. 1, the electro-spinning apparatus 110 is positioned between the melt-blowing apparatus 100 and the reception device 120. Therefore, the second fibers 160 are imported into the fiber web constructed by the first fibers 150 before the first fibers 150 and the second fibers 160 contact the reception device 120. At this time, the first fibers 150 and the second fibers 160 stack with each other in a random manner to form a three-dimensional non-woven structure. This arrangement of apparatuses leads to the uniform distribution of the second fibers 160 in the fiber web constructed by the first fibers 150. Thus, the three-dimensional non-woven structure is a structure in which fibers with different dimensions simultaneously present in a single layer. This is quite different to the conventional composite structure, i.e., a fiber layer constructed by coarse fibers combining with a fiber layer constructed by thin fibers.

Then, a film 170 having the three-dimensional non-woven structure formed by the first fibers 150 and the second fibers 160 are collected on the reception device 120. After the necessary cutting which depends on the application purpose, the film 170 can be used as a filter medium.

A filter medium 171 fabricated from the film 170 is further described with reference to FIG. 2.

Figure 2:
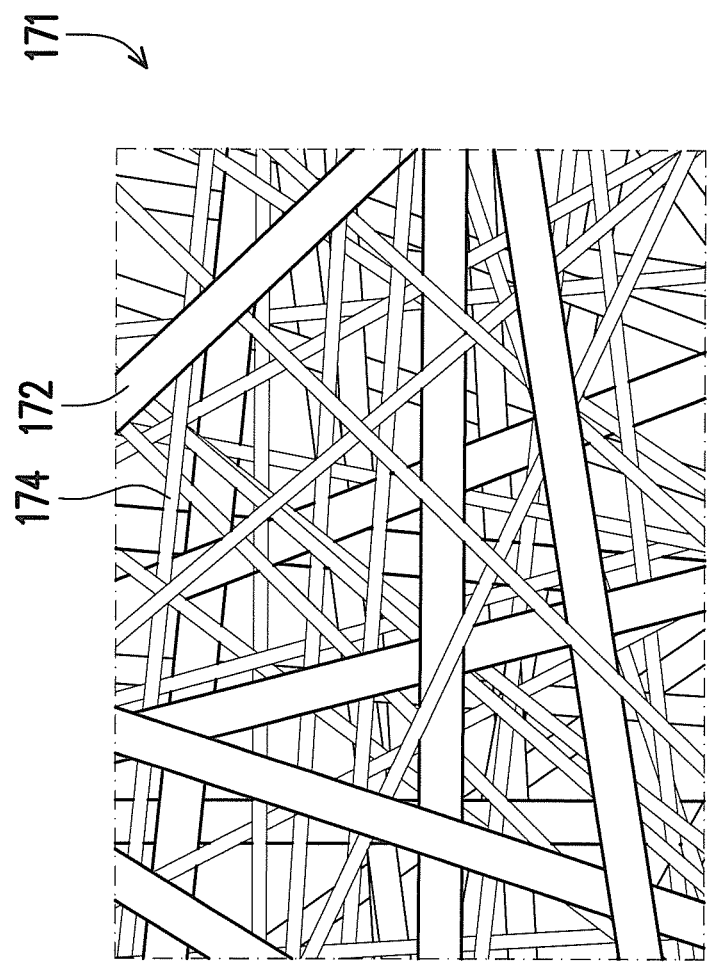
FIG. 2 is a schematic diagram illustrating a filter medium according to the second embodiment of the present invention.

Referring to FIG. 2, the filter medium 171 is formed by the first fibers 172 and the second fibers 174. The first fibers 172 and the second fibers 174 are substantially the same as the afore-mentioned first fibers 150 and the second fibers 160 except that they may have been cut if necessary. That is, the diameter of each of the first fibers 172 may be from 1 μm to 50 μm, and the diameter of each of the second fibers 174 may be from 1 nm to 1000 nm. There is no particular limit on the length of both of them. The first fibers 172 and the second fibers 174 stack with each other in a random manner.

The diameter of each of the first fibers 172 is greater than that of each of the second fibers 174, and accordingly the ability to withstand the external force of the first fibers 172 is better than that of the second fibers 174. Therefore, the mechanical strength of the filter medium 171 is provided mainly by the first fibers 172. In this regard, it may be said that the first fibers 172 form a supporting layer of the filter medium 171, wherein the second fibers 174 are dispersed in this supporting layer to further provide the filtration effect. The relative amount of the first fibers 172 and the second fibers 174 is not particularly limited as long as the film is structurally stable. For example, based on the total weight of the filter medium 170 (i.e., the sum of the weight of the first fibers 172 and the second fibers 174), the second fibers 174 may be 0.1% to 50%. Alternatively, based on the total weight of the filter medium 170, the second fibers 174 may be 70% to 80%.

Compared with the conventional filter medium, the filter medium 171 has the following unique and superior filtration properties. First, it should be noticed that the "pressure loss" and the "filtration efficiency" are two common standards for evaluating a filter medium. While gas passes through a filtration device having a filter medium, the filter medium provides resistance to and impede the gas flow, and this "loss of pressure" is referred to as the "pressure loss." The greater the pressure loss, the more power the filtration device needed to achieve the desired gas flow rate (i.e., more energy-consumptive). As to the "filtration efficiency," it indicates the ratio of numbers of particles adsorbing onto the filter medium to numbers of particles passing through the filter medium. The greater the "filtration efficiency," the better the filtration ability of the filter medium. In the field of the filter medium, a technology of fabricating a filter medium by nano-fibers has been developed. This kind of filter medium has a great mechanical blocking effect but results in an overly high pressure loss due to the dense structure. On the other hand, if a loose structure is used, the filtration efficiency will be poor. The filter medium 171 of the present invention has a composite structure composing of two different fibers, which overcomes the dilemma. The filter medium 171 not only provides a high filtration efficiency, but also gives a low pressure loss (e.g., less than 6 mmH$_2$O), which will be proved by the working examples and simulation experiments in the following section.

In addition, the present invention provides an air conditioning apparatus including the filter medium 171. In an embodiment, the filter medium 171, together with other components, can be assembled into the filters of the air conditioning apparatus, e.g., a filter having a paper frame or a box-type filter. The fabricating method of the filter having a paper frame generally includes the following steps. First, the filter medium is adhered to a galvanized aluminum mesh or a galvanized iron mesh which provide support to the filter medium so that the filter medium would not deform. After pleating, the filter medium is surrounded and covered by a thick cardboard to provide an airproof function as well as another support. The fabricating method of the box-type filter is generally the same but differs in that the filter medium is assembled to a box after pleating. The present invention of course does not limited to these embodiments, and any air conditioning apparatus including the aforementioned filter medium 171 is included in the scope of the present invention.

EXPERIMENTAL

Effects of the abovementioned embodiments will be evinced through the experimental examples. Although some experimental details are specifically described in the following section, the material used, the amount thereof, and the detailed process flow can be suitably modified without departure from the scope of this disclosure. Therefore, the scope of this disclosure should not be limited by the following experiments.

Experiment 1

Comparative Example 1-1

The apparatus 10 illustrated in FIG. 1 was used but only the first spinning device was turned on to form polypropylene fibers by a melt-blowing process, and the second spinning device was shut down. The operating parameters of the melt-blowing process are as follows. Pore size of the spinneret: 0.5 mm; output of the spinneret: 0.4-0.5 g/hole/min; pressure of the hot air drawing the fibers: 10 psi. A non-woven filter solely formed by the polypropylene fibers was collected on the reception device 120, in which the average diameter of the fibers is 9.5 µm, the filtration efficiency is 20.9%, and the pressure loss is 0.14 mmH$_2$O.

Experimental Examples 1-1 to 1-4

The apparatus 10 illustrated in FIG. 1 was used and both of the first spinning device and the second spinning device were turned on. Polypropylene fibers were formed by a melt-blowing process, and PVA nano-fibers were formed by an electro-spinning process. As described in the first embodiment, the PVA nano-fibers were embed in the polypropylene fibers, and both of them stack with each other to form a composite filter medium having a three-dimensional non-woven structure. The operating parameters of the melt-blowing process are the same as the comparative example 1-1. The operating parameters of the electro-spinning process are as follows: the spinning dope is a PVA solution (6 wt % to 12 wt %); the viscosity is 300 mPa·s; the ratio of PVA to isocyanate (i.e., thermal cross-linking agent) is 20:1; the operation voltage is 40 kV; the roller speed is 100 cm/s; the distance to the linear electrode is 12 cm. The filter mediums of the experimental example 1-1 to the experimental example 1-4 are obtained by changing the numbers of the operation electrodes and the roller speed to adjust the content of PVA nano-fibers in the composite filter medium.

Table 1 shows the filtration efficiency and the pressure loss of each of the filter medium of the comparative example 1-1 and the experimental example 1-1 to the experimental example 1-4. The experimental example 1-4 exhibits a filtration efficiency as high as 99.1% and a pressure loss as low as 3.77 mmH$_2$O.

TABLE 1

| | Basis weight of composite filter medium (g/m$^2$) | Basis weight of nano-fibers (g/m$^2$) | Filtration efficiency (%) | Pressure loss (mmH$_2$O) |
| --- | --- | --- | --- | --- |
| Comparative Example 1-1 | 15.98 | — | 20.9 | 0.14 |
| Experimental Example 1-1 | 16.42 | 0.44 | 84.8 | 0.78 |
| Experimental Example 1-2 | 17.23 | 1.25 | 92.8 | 1.37 |
| Experimental Example 1-3 | 17.84 | 1.46 | 96.3 | 1.80 |
| Experimental Example 1-4 | 18.09 | 2.11 | 99.1 | 3.77 |

Experiment 2

Comparative Example 2-1

The apparatus 10 illustrated in FIG. 1 was used but only the first spinning device was turned on, and the second spinning device was shut down. The operating parameters of the melt-blowing process are as follows. Pore size of the spinneret: 0.5 mm; discharge amount of the spinneret: 0.15-0.20 g/hole/min; pressure of the hot air drawing the fibers: 20 psi. A non-woven filter solely formed by the polypropylene fibers was collected on the reception device 120, in which the average diameter of the fibers is 2.5 μm, the filtration efficiency is 72.4%, and the pressure loss is 1.13 mmH$_2$O.

Experimental Examples 2-1 to 2-3

The apparatus 10 illustrated in FIG. 1 was used and both of the first spinning device and the second spinning device were turned on. Polypropylene fibers were formed by a melt-blowing process, and PVA nano-fibers were formed by an electro-spinning process. The operating parameters of the melt-blowing process are the same as the comparative example 2-1; the operating parameters of the electro-spinning process are the same as the experimental example 1-1. Similarly, the filter mediums of the experimental example 2-1 to the experimental example 2-3 are obtained by changing the numbers of the operation electrodes and the roller speed to adjust the content of PVA nano-fibers in the composite filter medium.

Table 2 shows the filtration efficiency and the pressure loss of each of the filter medium of the comparative example 2-1 and the experimental example 2-1 to the experimental example 2-3. The experimental example 2-3 exhibits a filtration efficiency as high as 99.2% and a pressure loss as low as 2.47 mmH$_2$O.

TABLE 2

|  | Basis weight of composite filter medium (g/m$^2$) | Basis weight of nano-fibers (g/m$^2$) | Filtration efficiency (%) | Pressure loss (mmH$_2$O) |
|---|---|---|---|---|
| Comparative Example 2-1 | 29.48 | — | 72.4 | 1.13 |
| Experimental Example 2-1 | 29.91 | 0.43 | 97.9 | 1.52 |
| Experimental Example 2-2 | 30.7 | 1.22 | 98.2 | 1.87 |
| Experimental Example 2-3 | 31.17 | 1.69 | 99.2 | 2.47 |

Experiment 3

Comparative Example 3-1

The apparatus 10 illustrated in FIG. 1 was used but only the first spinning device was turned on, and the second spinning device was shut down. The operating parameters of the melt-blowing process are as follows. Pore size of the spinneret: 0.2 mm; discharge amount of the spinneret: 0.01-0.10 g/hole/min; pressure of the hot air drawing the fibers: 20 psi. A non-woven filter solely formed by the polypropylene fibers was collected on the reception device 120, in which the average diameter of the fibers is 1.8 μm, the filtration efficiency is 84.25%, and the pressure loss is 1.3 mmH$_2$O.

Experimental Examples 3-1 to 3-3

The apparatus 10 illustrated in FIG. 1 was used and both of the first spinning device and the second spinning device were turned on. Polypropylene fibers were formed by a melt-blowing process, and PVA nano-fibers were formed by an electro-spinning process. The operating parameters of the melt-blowing process are the same as the comparative example 3-1; the operating parameters of the electro-spinning process are the same as the experimental example 1-1. Similarly, the filter mediums of the experimental example 3-1 to the experimental example 3-3 are obtained by changing the numbers of the operation electrodes to adjust the content of PVA nano-fibers in the composite filter medium.

Table 3 shows the filtration efficiency and the pressure loss of each of the filter medium of the comparative example 3-1 and the experimental example 3-1 to the experimental example 3-3. The experimental example 3-3 exhibits a filtration efficiency as high as 99.98% and a pressure loss as low as 5.7 mmH$_2$O.

Figure 3A:
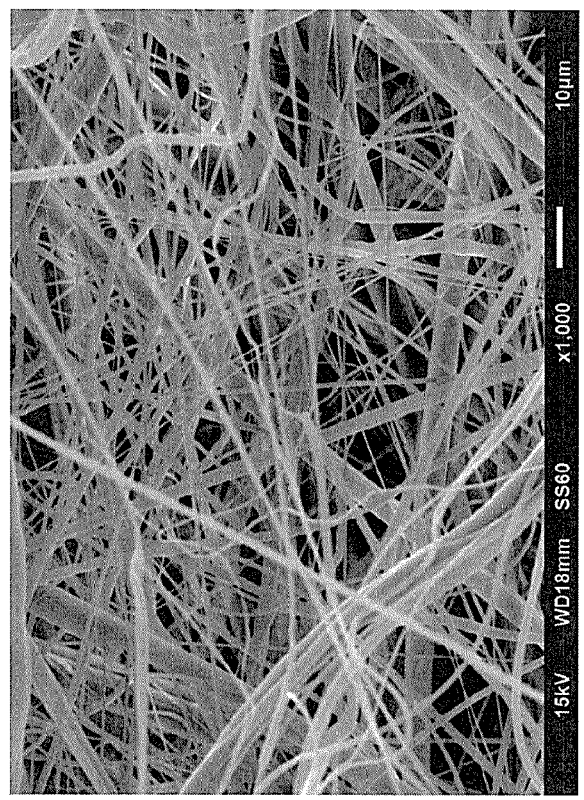
FIGS. 3A and 3B are the SEM images of the filter medium of the experimental example 3-3 under different magnification.
Figure 3B:
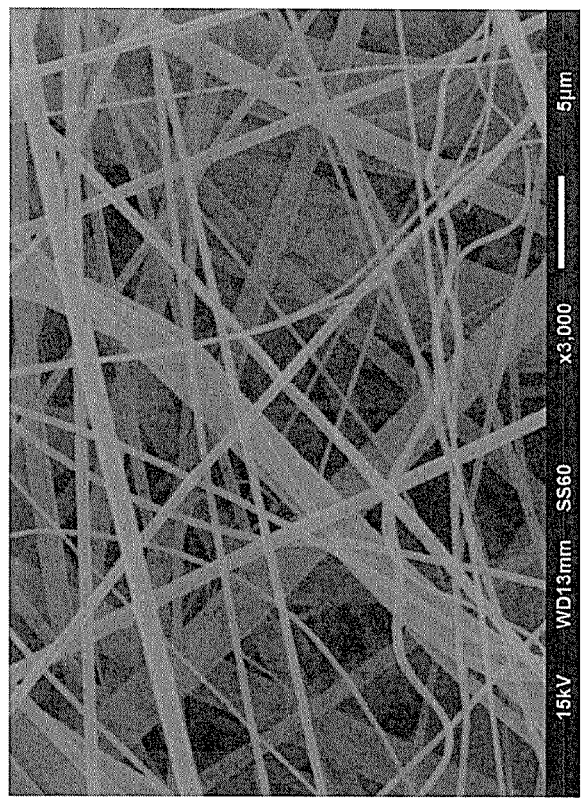

Further, FIGS. 3A and 3B shows the SEM photos of the filter of experimental example 3-3. It can be clearly seen in these figures that the composite filter medium of this invention has a structure composed of mutually stacked nano-fibers and micro-fibers.

TABLE 3

|  | Basis weight of composite filter medium (g/m$^2$) | Basis weight of nano-fibers (g/m$^2$) | Filtration efficiency (%) | Pressure loss (mmH$_2$O) |
|---|---|---|---|---|
| Comparative Example 3-1 | 20.53 | — | 84.25 | 1.3 |
| Experimental Example 3-1 | 21.01 | 0.48 | 99.7 | 2.2 |
| Experimental Example 3-2 | 21.76 | 1.23 | 99.86 | 2.8 |
| Experimental Example 3-3 | 22.17 | 1.64 | 99.98 | 5.7 |

Experiment 4

A composite filter medium of experimental example 3-3 was cut into a size of 10×10 cm$^2$ and then was used to fabricate a Mini Pleat V Type air filter. The life of this filter medium was tested under the condition of 602 m$^3$/hr airflow and 0.3 μm particle size. The test was ended as the pressure loss attained 20 mmH$_2$O. After numerous experiments, it is found that, at the as-described dimension, the filter medium can adsorb, in average, 0.0663 g of particles. If the filter medium is cut into a standard size of 34×0.6 cm$^2$, the dust holding capacity attains 135.252 g, which is comparable to one-year lifetime and is much greater than the dust holding capacity of the conventional V Type filter (60 g).

Accordingly, the present invention provides a filter medium and a method of fabricating the same. The filter medium contains two kinds of fibers with different diameter ranges. The thinner fibers are dispersed in the supporting layer composed of the coarse fibers. The filter medium has s superior filtration efficiency, and the pressure loss thereof is satisfactory.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A method of fabricating a filter medium, comprising:
   forming a plurality of first fibers by a first spinning device;

forming a plurality of second fibers by a second spinning device;

collecting, on a reception device, a film having a three-dimensional non-woven structure constructed by the first fibers and the second fibers, wherein each of the first fibers has a diameter of 1-50 μm; each of the second fibers has a diameter of 1-1000 nm; the second spinning device is located between the first spinning device and the reception device; the first fibers and the second fibers stack with each other in a random manner to form the three-dimensional non-woven structure; wherein the first spinning device is a melt-blowing apparatus and the second spinning device is an electro-spinning apparatus.

2. The method of claim 1, wherein each of the first fibers is a continuous long fiber or a short fiber having a length greater than 3 mm.

3. The method of claim 1, wherein each of the second fibers is a continuous long fiber.

4. The method of claim 1, wherein the first fibers are drew by a hot air having a pressure of 10-20 psi during the formation of the first fibers by the melt-blowing apparatus.

5. The method of claim 1, wherein the electro-spinning apparatus has a linear electrode connected to a high-voltage power supply, and is capable of producing continuous nano-fibers which then incorporates into a structure formed by the first fibers.

6. A filter medium, comprising:
a supporting layer constructed by a plurality of first fibers, wherein each of the first fibers has a diameter of 1-50 μm, and each of the first fibers is a continuous long fiber or a short fiber having a length greater than 3 mm; and a plurality of second fibers dispersed in the supporting layer, wherein each of the second fibers has a diameter of 1-1000 nm, and the second fibers and the first fibers stack with each other in a random manner to form a three-dimensional composite structure combining a nano-structure and a micro-structure; wherein the first fibers are formed by a skill of melt-blowing, and the second fibers are formed by an electro-spinning process.

7. The filter medium of claim 6, wherein each of the first fibers has a diameter of 1.0-50.0 μm, and each of the second fibers has a diameter greater than or equal to 1.0 nm and less than 1000.0 nm.

8. The filter medium of claim 6, wherein a content of the second fibers is 0.1-50.0% based on a total weight of the first fibers and the second fibers.

9. The filter medium of claim 6, wherein the supporting layer has a weight per unit area of 0.5-300.0 g/m$^2$.

10. An air conditioning equipment comprising the filter medium of claim 6.

* * * * *